United States Patent
Itagaki et al.

(10) Patent No.: US 9,432,610 B2
(45) Date of Patent: Aug. 30, 2016

(54) RECEIVER APPARATUS, TUNER, AND CIRCUIT

(71) Applicant: Sony Corporation, Tokyo (JP)

(72) Inventors: Tomoari Itagaki, Kanagawa (JP);
Kenji Komori, Kanagawa (JP);
Noboru Sasho, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/620,919

(22) Filed: Feb. 12, 2015

(65) Prior Publication Data

US 2015/0256787 A1 Sep. 10, 2015

(30) Foreign Application Priority Data

Mar. 4, 2014 (JP) .................. 2014-041423

(51) Int. Cl.
*H04N 5/50* (2006.01)
*H04N 5/44* (2011.01)
*H04N 21/426* (2011.01)
*H04B 1/00* (2006.01)
*H04H 40/18* (2008.01)
*H04H 40/90* (2008.01)
*H04N 7/20* (2006.01)

(52) U.S. Cl.
CPC .............. *H04N 5/50* (2013.01); *H04B 1/0071* (2013.01); *H04H 40/18* (2013.01); *H04H 40/90* (2013.01); *H04N 5/44* (2013.01); *H04N 21/4263* (2013.01); *H04N 7/20* (2013.01)

(58) Field of Classification Search
CPC ......... H04N 5/50; H04N 5/4401; H04N 5/44
USPC ....................................................... 348/731
See application file for complete search history.

(56) References Cited

U.S. PATENT DOCUMENTS

| | | | | |
|---|---|---|---|---|
| 4,982,444 A | * | 1/1991 | Matsuura | H04B 1/16 348/733 |
| 5,014,349 A | * | 5/1991 | Kubo | H03D 7/161 348/731 |
| 5,774,194 A | * | 6/1998 | Armbruster | H03D 3/242 348/726 |
| 8,212,943 B2 | * | 7/2012 | Wang | H03D 7/16 348/729 |
| 2006/0274215 A1 | * | 12/2006 | Tseng | H03D 7/14 348/731 |
| 2007/0046834 A1 | * | 3/2007 | Yamamoto | H03D 7/1425 348/731 |
| 2007/0110019 A1 | * | 5/2007 | Behzad | H04B 1/28 370/342 |

FOREIGN PATENT DOCUMENTS

JP 06133317 A * 5/1994
JP 2013-236196 11/2013

* cited by examiner

*Primary Examiner* — Michael Lee
(74) *Attorney, Agent, or Firm* — Michael Best & Friedrich LLP (57) ABSTRACT

Provided is a receiver apparatus, including: a first receiver configured to receive a first signal having a first frequency band; and a second receiver configured to receive a second signal having a second frequency band, the second frequency band being different from the first frequency band, in which a signal path for the first signal and a signal path for the second signal share at least one component in a signal path for extracting an intermediate-frequency signal from a received signal, the component being configured to extract a signal of a particular channel from the received signal as the intermediate-frequency signal.

9 Claims, 8 Drawing Sheets

FIG.3A Fundamental waves

FIG.3B Third harmonics

FIG.3C Fifth harmonics

FIG.4

FIG.5A Fundamental waves

FIG.5B Third harmonics

FIG.5C Fifth harmonics

| | Terrestrial | Satellite |
|---|---|---|
| SW11~SW42 | On | Off |

|  | Terrestrial | Satellite |
|---|---|---|
| SW11~SW42 | On | Off |
| SW51-a, SW52-a | Off | On |
| SW51-b, SW52-b | On | Off |

RECEIVER APPARATUS, TUNER, AND CIRCUIT

CROSS REFERENCE TO RELATED APPLICATIONS

This application claims the benefit of Japanese Priority Patent Application JP 2014-041423 filed Mar. 4, 2014, the entire contents of which are incorporated herein by reference.

BACKGROUND

The present technology relates to a receiver apparatus, a tuner, and a circuit.

If one IC has functions of receiving broadcasted (sent) signals having different frequency bands (for example, terrestrial television broadcasting and satellite television broadcasting) as independent receiving functions, the layout area may be increased in size.

In view of the above-mentioned circumstances, according to the technology disclosed in Japanese Patent Application Laid-open No. 2013-236196, a phase synchronous circuit and a voltage control oscillator are used to receive both terrestrial television broadcasting and satellite television broadcasting. As a result, the layout area of an IC is downsized.

SUMMARY

According to the above-mentioned Japanese Patent Application Laid-open No. 2013-236196, if the range of the frequency that a local oscillator circuit is capable of oscillating is extended, a local oscillator circuit block may be used when receiving both terrestrial television broadcasting and satellite television broadcasting. However, it is difficult to use the same components (for example, signal path for received signal) other than the local oscillator circuit block when receiving both terrestrial television broadcasting and satellite television broadcasting, because the specs of terrestrial television broadcasting are greatly different from the specs of satellite television broadcasting.

In view of the above-mentioned circumstances, it is desirable to provide a larger number of components, which can be shared to receive broadcasted (sent) signals having different frequency bands, and to therefore further downsize the layout area of a circuit having the receiving functions.

According to an embodiment of the present technology, there is provided a receiver apparatus, including: a first receiver configured to receive a first signal having a first frequency band; and a second receiver configured to receive a second signal having a second frequency band, the second frequency band being different from the first frequency band, in which a signal path for the first signal and a signal path for the second signal share at least one component in a signal path for extracting an intermediate-frequency signal from a received signal, the component being configured to extract a signal of a particular channel from the received signal as the intermediate-frequency signal.

According to an embodiment of the present technology, there is provided a tuner, including: a first receiver configured to receive a first signal having a first frequency band; and a second receiver configured to receive a second signal having a second frequency band, the second frequency band being different from the first frequency band, in which a signal path for the first signal and a signal path for the second signal share at least one component in a signal path for extracting an intermediate-frequency signal from a received signal, the component being configured to extract a signal of a particular channel from the received signal as the intermediate-frequency signal.

According to an embodiment of the present technology, there is provided a circuit, including: a first receiver configured to receive a first signal having a first frequency band; and a second receiver configured to receive a second signal having a second frequency band, the second frequency band being different from the first frequency band, in which a signal path for the first signal and a signal path for the second signal share at least one component in a signal path for extracting an intermediate-frequency signal from a received signal, the component being configured to extract a signal of a particular channel from the received signal as the intermediate-frequency signal.

Each of the above-mentioned receiver apparatus, tuner, and circuit may have various modes. For example, each of them may be embedded in another apparatus and operated. Alternatively, each of them may also execute another method. Further, according to the present technology, a system including each of the receiver apparatus, tuner, and circuit, a driving method including steps corresponding to the configuration of the above-mentioned apparatus, a program causing a computer to function as the configuration of the above-mentioned apparatus, a recording medium which records the program and can be read by a computer, and the like may be attained.

According to the present technology, a larger number of components can be shared to receive broadcasted (sent) signals having different frequency bands. As a result, it is possible to further downsize the layout area of a circuit having the receiving functions. Note that the effects described in this specification are merely examples and not limitation. Further, additional effects may be obtained.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

[Entire Outlined Configuration]

Figure 1:
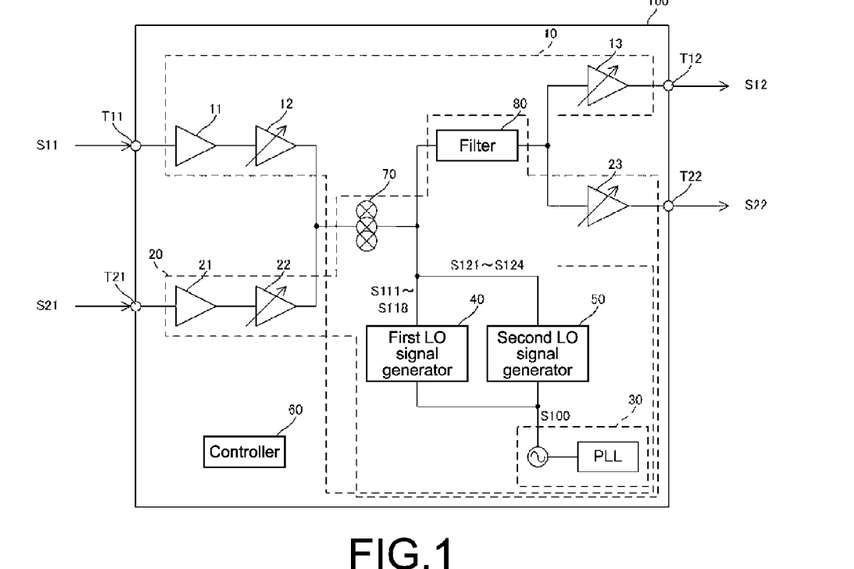
FIG. 1 is a block diagram showing an example of the functional configuration of a tuner.

FIG. 1 is a block diagram showing an example of the functional configuration of a tuner of this embodiment. Note that the tuner of this embodiment may have various modes. For example, the tuner may be a module or part of a receiver apparatus.

For example, the tuner of this embodiment is each of various kinds of apparatuses (television, video recorder, set-top box, etc.) capable of receiving terrestrial television broadcasting and satellite television broadcasting, and capable of reproducing broadcast signals. As a matter of course, the tuner of this embodiment may not necessarily receive television broadcasting. The tuner of this embodiment may be any apparatus configured to receive signals from two systems, and to selectively function as one of a lowpass filter and a bandpass filter as necessary.

In the following description, the tuner 100 is an integrated circuit (IC) chip including a first receiver 10 and a second receiver 20. The first receiver 10 is configured to receive terrestrial television broadcasting. The second receiver 20 is configured to receive satellite television broadcasting. Note that in this embodiment, terrestrial television broadcasting signals are first signals having a first frequency band, and satellite television broadcasting signals are second signals having a second frequency band.

[Overall Configuration]

The first radio-frequency signal S11 (first RF signal S11) of terrestrial television broadcasting, i.e., a first signal, is input in the first input terminal T11 of the tuner 100. The first receiver 10 generates the first intermediate-frequency signal S12 (first IF signal S12). The tuner 100 outputs the first intermediate-frequency signal S12 (first IF signal S12) from the first output terminal T12.

Further, the second radio-frequency signal S21 (second RF signal S21) of satellite television broadcasting, i.e., a second signal, is input in the second input terminal T21 of the tuner 100. The second receiver 20 generates the second intermediate-frequency signal S22 (second IF signal S22). The tuner 100 outputs the second intermediate-frequency signal S22 (second IF signal S22) from the second output terminal T22.

The tuner 100 includes the first receiver 10, the second receiver 20, in addition, the reference oscillator signal generator 30, the first local oscillator signal generator 40 (first LO signal generator 40), the second local oscillator signal generator 50 (second LO signal generator 50), and the controller 60. The reference oscillator signal generator 30 is configured to generate the reference oscillator signal 5100. The first LO signal generator 40 is a local oscillator configured to generate eight local oscillator frequency signals S111 to S118 having different phases based on the reference oscillator signal 5100. The second LO signal generator 50 is a local oscillator configured to generate four local oscillator frequency signals S121 to S124 having different phases based on the reference oscillator signal 5100. The controller 60 is configured to control behaviors of the tuner 100.

For example, the first LO signal generator 40 includes a first frequency-divider circuit and a second frequency-divider circuit. The first frequency-divider circuit divides the reference oscillator signal 5100 into two signals corresponding to the frequency of the received signal. After that, the second frequency-divider circuit divides each of the two signals into four signals. As a result, the first LO signal generator 40 generates eight-phase local oscillator frequency signals S111 to S118 (LO signals S111 to S118). The LO signals S111 to S118 are out of phase with each other by 45 degrees.

Meanwhile, for example, the second LO signal generator 50 includes a third frequency-divider circuit and a fourth frequency-divider circuit. The third frequency-divider circuit divides the reference oscillator signal 5100 into two signals corresponding to the frequency of the received signal. After that, the fourth frequency-divider circuit divides each of the two signals into two signals. As a result, the second LO signal generator 50 generates four-phase local oscillator frequency signals S121 to S124 (LO signals S121 to S124). The LO signals S121 to S124 are out of phase with each other by 90 degrees. Note that one frequency divider may be function as both the first frequency divider of the first LO signal generator 40 and the third frequency divider of the second LO signal generator 50.

The first LO signal generator 40 generates the LO signals S111 to S118 within the range of the terrestrial television broadcasting frequency band, i.e., 42 MHz to 1002 MHz. The second LO signal generator 50 generates the LO signals S121 to S124 within the range of the satellite television broadcasting frequency band, i.e., 950 MHz to 2150 MHz.

Note that in the example shown in FIG. 1, the reference oscillator signal generator 30 functions as both the reference oscillator signal generator configured to generate reference oscillator signals for terrestrial television broadcasting, and the reference oscillator signal generator configured to generate reference oscillator signals for satellite television broadcasting.

Alternatively, a reference oscillator signal generator configured to generate reference oscillator signals for terrestrial television broadcasting, and another reference oscillator signal generator configured to generate reference oscillator signals for satellite television broadcasting may be provided separately.

[First Receiver]

The first receiver 10 includes the first low-noise amplifier 11, the first RF variable amplifier 12, the first mixer 70a (not shown), the first filter 80a (not shown), and the first IF variable amplifier 13. The first low-noise amplifier 11 is configured to amplify the first RF signal S11 at a low noise. The first RF variable amplifier 12 is configured to amplify or damp the first RF signal S11. The first mixer 70a (not shown) is configured to mix the LO signals S111 to S118 input from the first LO signal generator 40 and the first RF signal S11, and to amplify an RF signal of only a particular channel to thereby generate the first IF signal S12. The first filter 80a (not shown) is configured to remove the signal of unnecessary channels from the first IF signal S12. The first IF variable amplifier 13 is configured to amplify the first IF signal S12.

[Second Receiver]

The second receiver 20 includes the second low-noise amplifier 21, the second RF variable amplifier 22, the second mixer 70b (not shown), the second filter 80b (not shown), and the second IF variable amplifier 23. The second low-noise amplifier 21 is configured to amplify the second RF signal S12 at a low noise. The second RF variable amplifier 22 is configured to amplify or damp the second RF signal S12. The second mixer 70b (not shown) is configured to mix the LO signals S121 to S124 input from the second LO signal generator 50 and the second RF signal S12, and to amplify an RF signal of only a particular channel to thereby generate the second IF signal S22. The second filter 80b (not shown) is configured to remove the signal of unnecessary channels from the second IF signal S22. The second IF variable amplifier 23 is configured to amplify the second IF signal S22.

[Shared Configuration]

Here, in this embodiment, one mixer 70 functions as both the first mixer 70a (not shown) and the second mixer 70b (not shown). One filter 80 functions as both the first filter 80a (not shown) and the second filter 80b (not shown).

In other words, at least one component of a signal path for extracting the first IF signal S12 from the first RF signal S11, the component being configured to output a signal of a particular channel from the first RF signal S11 as the first IF signal S12, and at least one component of a signal path for extracting the second IF signal S22 from the second RF signal S21, the component being configured to output a signal of a particular channel from the second RF signal S21 as the second IF signal S22, are shared.

As a result, a larger number of components can be shared to receive broadcasted (sent) signals having different frequency bands. As a result, it is possible to further downsize the layout area of a circuit having the receiving functions.

[Mixer]

Figure 2:
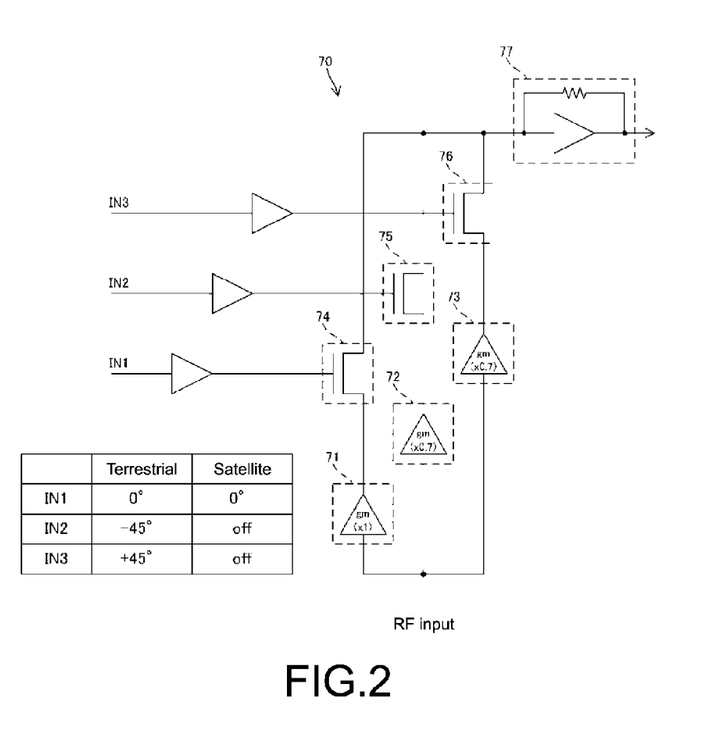
FIG. 2 is a diagram showing a configuration example of the mixer.

FIG. 2 is a diagram showing a configuration example of the mixer 70. The mixer 70 of this embodiment functions as a so-called harmonic rejection mixer. Effects of third harmonics and fifth harmonics of a local oscillator frequency signal are removed from a signal output from the mixer 70.

Note that FIG. 2 is a simplified diagram. In FIG. 2, IQ and differential are not shown. For example, a mixer for an I-phase positive differential signal is shown as a specific example. In this case, the phase of an LO signal input in a mixer for an I-phase negative differential signal is different from that of FIG. 2 by 180 degrees. The phase of an LO signal input in a mixer for a Q-phase positive differential signal is different from that of FIG. 2 by 90 degrees. The phase of an LO signal input in a mixer for a Q-phase negative differential signal is different from the phase of an LO signal input in a mixer for the Q-phase positive differential signal by 180 degrees.

The mixer 70 includes the voltage-to-current converter circuits 71 to 73, the switch circuits 74 to 76, and the current-to-voltage converter circuit 77.

[Voltage-to-Current Converter Circuit]

For example, each of the voltage-to-current converter circuits 71 to 73 is a transconductance amplifier. The first RF signal S11 or the second RF signal S21 is input in each of the voltage-to-current converter circuits 71 to 73. Each of the voltage-to-current converter circuits 71 to 73 is configured to amplify the voltage value of the input RF signal by a predetermined amplification factor, and to output the obtained current value.

The amplification factor of each voltage-to-current converter circuit is determined such that an LO signal is nearly sinusoidal. The amplification factor of the voltage-to-current converter circuit 71 is 1. The amplification factor of the voltage-to-current converter circuit 72 is 0.7. The amplification factor of the voltage-to-current converter circuit 73 is 0.7. Note that in this specification, the amplification factor or phase "0.7" is an approximate value of an inverse of $\sqrt{2}$.

[Switch Circuit]

The switch circuit 74 is configured to turn on/off current output from the voltage-to-current converter circuit 71, whose amplification factor is 1, to the current-to-voltage converter circuit 77. The switch circuit 75 is configured to turn on/off current output from the voltage-to-current converter circuit 72, whose amplification factor is 0.7, to the current-to-voltage converter circuit 77. The switch circuit 76 is configured to turn on/off current output from the voltage-to-current converter circuit 73, whose amplification factor is 0.7, to the current-to-voltage converter circuit 77.

When receiving terrestrial television broadcasting, the switch circuit 74 is turned on/off based on an LO signal IN1, whose phase is 0 degrees. The switch circuit 75 is turned on/off based on an LO signal IN2, whose phase is −45 degrees. The switch circuit 76 is turned on/off based on an LO signal IN3, whose phase is +45 degrees.

Note that the above-mentioned phases of the LO signals are used to detect an I-phase positive differential signal. The phases of the LO signals IN1, IN2, and IN3 used to detect the other signals are as follows. The phases of the LO signals IN1, IN2, and IN3 used to detect an I-phase negative differential signal are 180 degrees, 135 degrees, and −135 degrees. The phases of the LO signals IN1, IN2, and IN3 used to detect a Q-phase positive differential signal are 90 degrees, 45 degrees, and 135 degrees. The phases of the LO signals IN1, IN2, and IN3 used to detect a Q-phase negative differential signal are 270 degrees, −45 degrees, and −135 degrees.

When receiving satellite television broadcasting, the switch circuit 74 is turned on/off based on an LO signal, whose signal phase is 0 degrees. The switch circuit 75 and the switch circuit 76 are always turned off because no LO signal is input.

[Current-to-Voltage Converter Circuit]

For example, the current-to-voltage converter circuit 77 is an operational amplifier circuit using a feedback resistor. A synthetic vector of currents input from the voltage-to-current converter circuits 71 to 73 is input in the current-to-voltage converter circuit 77 via the switch circuits 74 to 76. The current-to-voltage converter circuit 77 is configured to output voltage depending on the input current. The voltage output from the current-to-voltage converter circuit 77, i.e., the voltage output from the tuner 100, is output to a latter demodulator circuit (not shown).

[gm Synthetic Vector when Receiving Terrestrial Television Broadcasting]

Figure 3A:
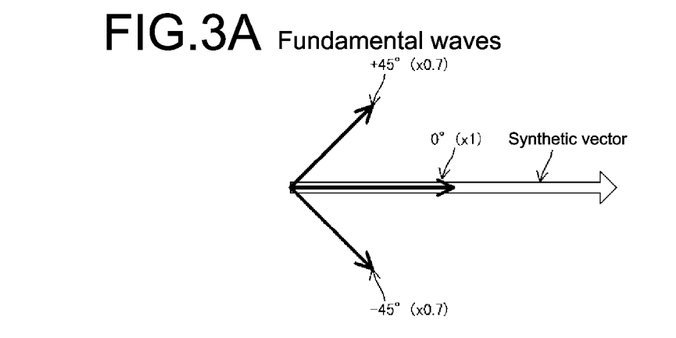
FIGS. 3A to 3C are diagrams each illustrating a gm synthetic vector when receiving terrestrial television broadcasting.
Figure 3B:
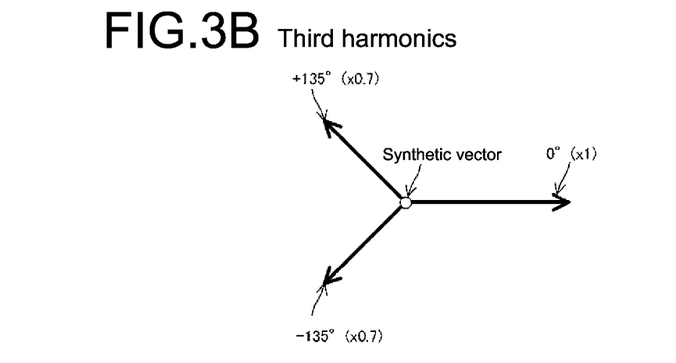
Figure 3C:
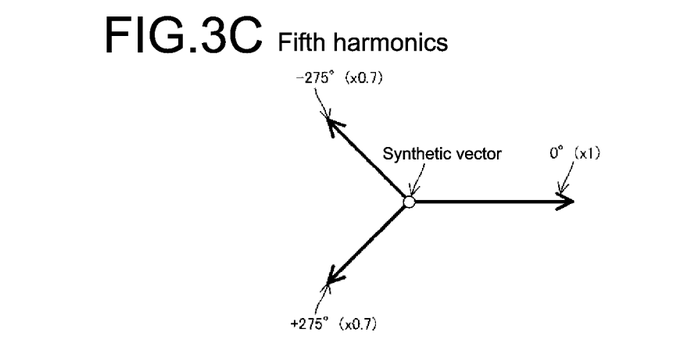

Each of FIG. 3 is a diagram illustrating a gm synthetic vector of the mixer 70 configured as described above when receiving terrestrial television broadcasting.

FIG. 3A shows a gm synthetic vector of fundamental waves. The quadrature-phase component of a signal (phase is +45 degrees) output from the voltage-to-current converter circuit 72 and a signal (phase is 0 degrees) output from the voltage-to-current converter circuit 71, and the quadrature-phase component of a signal (phase is −45 degrees) output from the voltage-to-current converter circuit 73 and the signal (phase is 0 degrees) output from the voltage-to-current converter circuit 71 cancel each other out. The in-phase component of the signal (phase is +45 degrees) output from the voltage-to-current converter circuit 72 and the signal (phase is 0 degrees) output from the voltage-to-current converter circuit 71, and the in-phase component of the signal (phase is −45 degrees) output from the voltage-to-current converter circuit 73 and the signal (phase is 0 degrees) output from the voltage-to-current converter circuit 71 are added to the signal (phase is 0 degrees) output from the voltage-to-current converter circuit 71. As a result, the gm of the entire mixer 70 is doubled.

FIG. 3B shows a gm synthetic vector of third harmonics. The quadrature-phase component of a signal (phase is +135 degrees) output from the voltage-to-current converter circuit 72 and a signal (phase is 0 degrees) output from the voltage-to-current converter circuit 71, and the quadrature-phase component of a signal (phase is −135 degrees) output from the voltage-to-current converter circuit 73 and the signal (phase is 0 degrees) output from the voltage-to-current converter circuit 71 cancel each other out. The in-phase component of the signal (phase is +135 degrees) output from the voltage-to-current converter circuit 72 and the signal (phase is 0 degrees) output from the voltage-to-current converter circuit 71, and the in-phase component of the signal (phase is −135 degrees) output from the voltage-to-current converter circuit 73 and the signal (phase is 0 degrees) output from the voltage-to-current converter circuit 71 are subtracted from the signal (phase is 0 degrees) output from the voltage-to-current converter circuit 71. As a result, the gm of the entire mixer 70 is ZERO. In other words, the third harmonics are canceled.

FIG. 3C shows a gm synthetic vector of fifth harmonics. The quadrature-phase component of a signal (phase is +225 degrees (=−45 degrees)) output from the voltage-to-current converter circuit 72 and a signal (phase is 0 degrees) output from the voltage-to-current converter circuit 71, and the quadrature-phase component of a signal (phase is −225 degrees (=45 degrees)) output from the voltage-to-current converter circuit 73 and the signal (phase is 0 degrees) output from the voltage-to-current converter circuit 71 cancel each other out. The in-phase component of the signal (phase is +225 degrees (=−45 degrees)) output from the voltage-to-current converter circuit 72 and the signal (phase is 0 degrees) output from the voltage-to-current converter circuit 71, and the in-phase component of the signal (phase is −225 degrees (=45 degrees)) output from the voltage-to-current converter circuit 73 and the signal (phase is 0 degrees) output from the voltage-to-current converter circuit 71 are subtracted from the signal (phase is 0 degrees) output from the voltage-to-current converter circuit 71. As a result, the gm of the entire mixer 70 is ZERO. In other words, the fifth harmonics are canceled.

[gm Synthetic Vector when Receiving Satellite Television Broadcasting]

Meanwhile, when receiving satellite television broadcasting, the switch circuits 75 and 76 are turned off. So signals output from the voltage-to-current converter circuits 72 and 73 are not input in the current-to-voltage converter circuit 77. Because of this, the mixer 70 operates based on only LO signals having the general four phases (0 degrees, 90 degrees, −90 degrees, and 180 degrees). As a result, when receiving satellite television broadcasting, it is not necessary to double the frequency of the reference oscillator signal generator 30. It is possible to cut electricity consumption.

[Another Configuration Example of Mixer]

Figure 4:
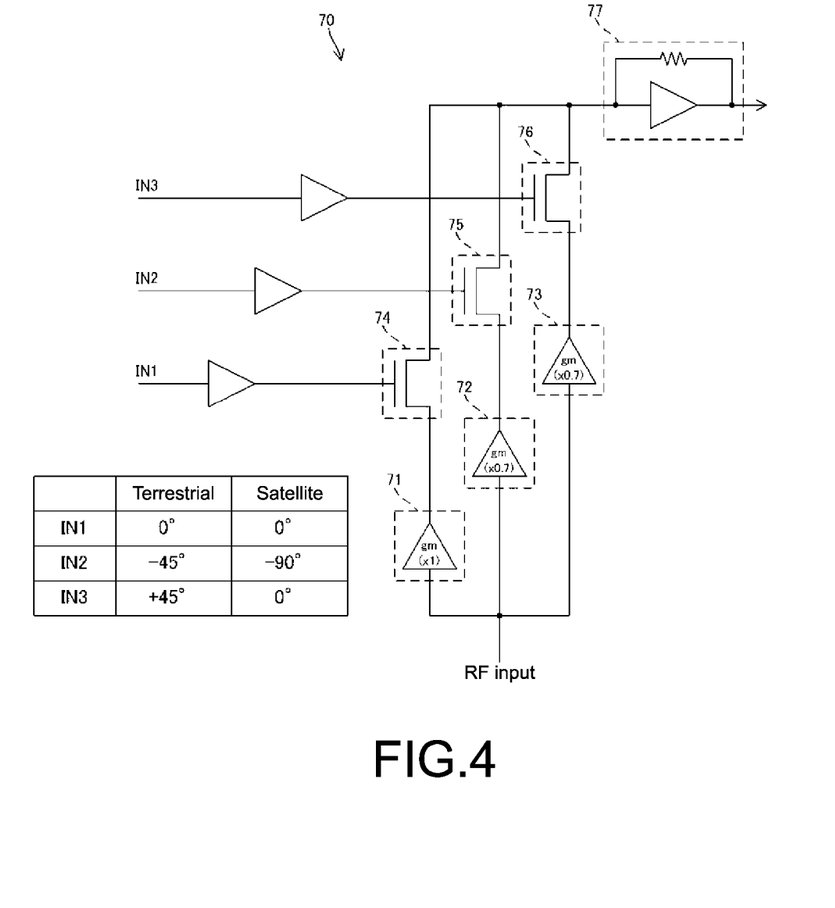
FIG. 4 is a diagram showing another configuration example of the mixer.

FIG. 4 is a diagram showing another configuration example of the mixer 70. The circuit configuration of the mixer 70 of FIG. 4 is the same as the circuit configuration of the above-mentioned FIG. 2. The LO signals of FIG. 4, based on which the switch circuits 74 to 76 are turned on/off, are different from those of FIG. 2.

[Switch Circuit]

The mixer 70 of FIG. 4 is controlled as follows when receiving terrestrial television broadcasting. The switch circuit 74 is turned on/off based on the LO signal IN1, whose signal phase is 0 degrees. The switch circuit 75 is turned on/off based on the LO signal IN2, whose signal phase is −45 degrees. The switch circuit 76 is turned on/off based on the LO signal IN3, whose signal phase is +45 degrees.

Note that the above-mentioned phases of the LO signals are used to detect an I-phase positive differential signal. The phases of the LO signals IN1, IN2, and IN3 used to detect the other signals are as follows. The phases of the LO signals IN1, IN2, and IN3 used to detect an I-phase negative differential signal are 180 degrees, +135 degrees, and −135 degrees. The phases of the LO signals IN1, IN2, and IN3 used to detect a Q-phase P differential signal are 90 degrees, 45 degrees, and 135 degrees. The phases of the LO signals IN1, IN2, and IN3 used to detect a Q-phase N differential signal are 270 degrees, −45 degrees, and −135 degrees.

Further, when receiving satellite television broadcasting, the switch circuit 74 is turned on/off based on the LO signal IN1, whose signal phase is 0 degrees. The switch circuit 75 is turned on/off based on the LO signal IN2, whose signal phase is −90 degrees. The switch circuit 76 is turned on/off based on the LO signal IN3, whose signal phase is 0 degrees.

Note that the above-mentioned phases of the LO signals are used to detect an I-phase positive differential signal. The phases of the LO signals IN1, IN2, and IN3 used to detect the other signals are as follows. The phases of the LO signals IN1, IN2, and IN3 used to detect an I-phase negative differential signal are 180 degrees, +90 degrees, and 180 degrees. The phases of the LO signals IN1, IN2, and IN3 used to detect a Q-phase P differential signal are 90 degrees, 0 degrees, and 90 degrees. The phases of the LO signals IN1, IN2, and IN3 used to detect a Q-phase N differential signal are −90 degrees, 180 degrees, and +90 degrees.

In other words, when receiving not only terrestrial but also satellite television broadcasting, the switch functions for inputting the signals output from the voltage-to-current converter circuits 72 and 73 in the current-to-voltage converter circuit 77 are not turned off. In short, the mixer 70 functions as a harmonic rejection mixer. Specifically, the generated LO signals, which are out of phase with each other by 90 degrees, are input also in the switch circuits 75 and 76.

[gm Synthetic Vector when Receiving Satellite Television Broadcasting]

Figure 5A:
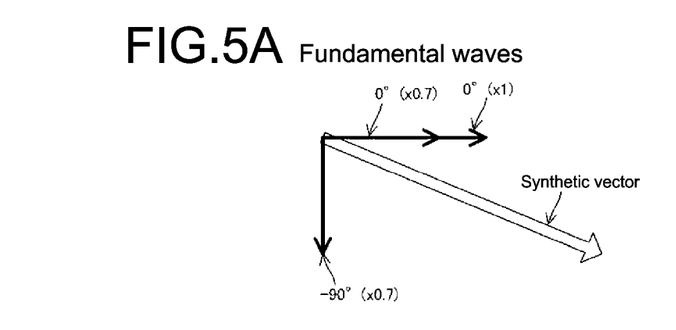
FIGS. 5A to 5C are diagrams each illustrating a gm synthetic vector when receiving satellite television broadcasting.
Figure 5B:
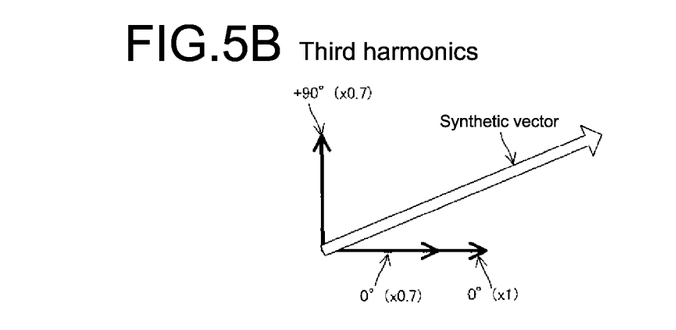
Figure 5C:
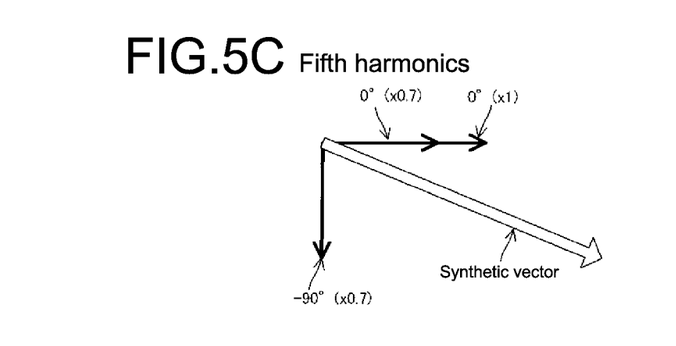

Each of FIG. 5 is a diagram illustrating a gm synthetic vector when receiving satellite television broadcasting in this case. Note that gm synthetic vectors when receiving terrestrial television broadcasting are similar to the gm synthetic vectors of the mixer 70 shown in the above-mentioned FIG. 3.

FIG. 5A shows a gm synthetic vector of fundamental waves. The signal (phase is 0 degrees) output from the voltage-to-current converter circuit 73 is added to the signal (phase is 0 degrees) output from the voltage-to-current converter circuit 71, the phases of those signals being the same. The signal (phase is −90 degrees) output from the voltage-to-current converter circuit 72 is a quadrature-phase component of the signals output from the voltage-to-current converter circuits 71 and 73. Here, the gm of the entire mixer 70 is 1.85 times. The gm (1.85 times) is less than the gm (double) of the above-mentioned harmonic rejection mixer. Still, degradation is about −1 dB in a voltage gain. An influence on noise characteristics is very small.

FIG. 5B shows a gm synthetic vector of third harmonics. The signal (phase is 0 degrees) output from the voltage-to-current converter circuit 73 is added to the signal (phase is 0 degrees) output from the voltage-to-current converter circuit 71, the phases of those signals being the same. The signal (phase is −270 degrees (=+90 degrees)) output from the voltage-to-current converter circuit 72 is a quadrature-phase component of the signals output from the voltage-to-current converter circuits 71 and 73. In other words, the third harmonics are not canceled and remain. However, odd-order harmonics do not affect satellite television broadcasting being received. So odd-order harmonics do not affect noise characteristics.

FIG. 5C shows a gm synthetic vector of fifth harmonics. The signal (phase is 0 degrees) output from the voltage-tocurrent converter circuit 73 is added to the signal (phase is 0 degrees) output from the voltage-to-current converter circuit 71, the phases of those signals being the same. The signal (phase is −450 degrees (=−90 degrees)) output from the voltage-to-current converter circuit 72 is a quadrature-phase component of the signals output from the voltage-to-current converter circuits 71 and 73. In other words, the fifth harmonics are not canceled and remain. However, odd-order harmonics do not affect satellite television broadcasting being received. So odd-order harmonics do not affect noise characteristics.

[Conclusion]

As described above, the mixer 70 is provided, and the mixer 70 can function as a harmonic rejection mixer when receiving terrestrial television broadcasting. When receiving terrestrial television broadcasting, a local oscillator frequency signal contains third and fifth harmonics. The oscillator frequency signal is a digital rectangular wave occurring due to switching operations. The mixer 70 cancels the third and fifth harmonics. So noise characteristics are not degraded. Further, when receiving satellite television broadcasting, the mixer 70 is operated based on only four-phase signals. So it is not necessary to double a PLL-VCO frequency, and it is possible to cut electricity consumption.

[Filter]

Figure 6:
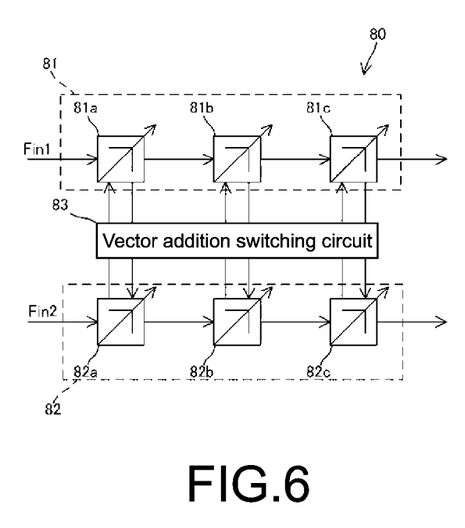
FIG. 6 is a diagram showing a configuration example of the filter.

FIG. 6 is a diagram showing a configuration example of the filter 80. The mixer 70 inputs an I-phase intermediate-frequency signal in the input port Fin1 of the filter 80. The mixer 70 inputs a Q-phase intermediate-frequency signal in the input port Fin2 of the filter 80.

As shown in FIG. 6, the filter 80 includes the filter 81, the filter 82, and the switching circuit 83. The filter 81 is a first lowpass filter, in which an I signal is input. The filter 82 is a second lowpass filter, in which a Q signal is input. The switching circuit 83 is configured to turn on/off addition of vectors of the filter 81 and the filter 82.

The filter 81 is a multistage filter, and includes a plurality of lowpass filters 81a to 81c connected to one another. With this configuration, desired frequency characteristics can be realized, with which unnecessary harmonic components remaining in an intermediate-frequency signal are cut.

Similarly, the filter 82 is a multistage filter, and includes a plurality of lowpass filters 82a to 82c connected to one another. With this configuration, desired frequency characteristics can be realized, with which unnecessary harmonic components remaining in an intermediate-frequency signal are cut.

When the switching circuit 83 is turned on, the filter 81a is connected to the filter 82a, and they functions as a complex filter. The filter 81b is connected to the filter 82b, and they functions as a complex filter. The filter 81c is connected to the filter 82c, and they functions as a complex filter. In other words, the filter 80 functions as a bandpass filter.

In this embodiment, each of those complex filters functions as a biquad filter (described later). Note that in this embodiment, the filter 80 is an active filter network including an operational amplifier and an RC circuit. Alternatively, the filter 80 may be a Gm-C filter network including a transconductance amplifier and capacitance.

When the switching circuit 83 is turned off, each of the filter 81 and the filter 82 functions as a multistage lowpass filter independently. In other words, each of the filter 81 and the filter 82 functions as a lowpass filter.

In this embodiment, the switching circuit 83 is turned on when receiving terrestrial television broadcasting, and is turned off when receiving satellite television broadcasting. For example, the controller 60 turns on/off the switching circuit 83.

[Specific Circuit Configuration]

Figure 7A:
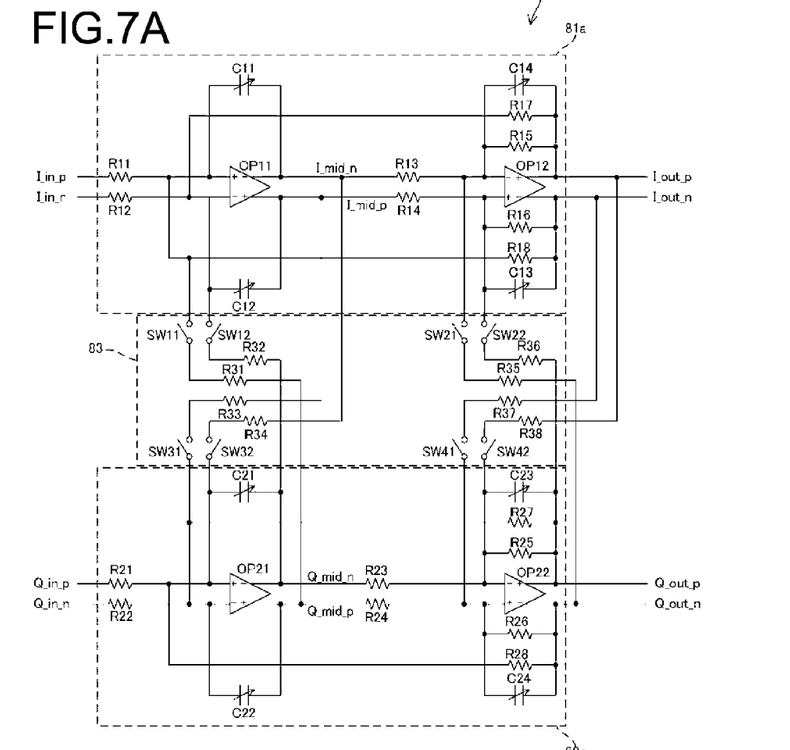
FIGS. 7A and 7B are diagrams showing a specific configuration of the filter.
Figure 7B:
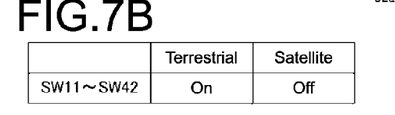

FIG. 7 are diagrams showing a specific configuration of the filter 80. FIG. 7A shows the filter 81a, the filter 82a, and part of the switching circuit 83, which is configured to connect the filters 81a and 82a, out of the filter 80.

The filter 81a is a second-order lowpass filter including a first operational amplifier OP11 and a second operational amplifier OP12. The filter 82a is a second-order lowpass filter including a third operational amplifier OP21 and a fourth operational amplifier OP22.

[First Operational Amplifier]

The first operational amplifier OP11 is a balanced amplifier. The I-phase differential signals (I_in_n, I_in_p) are input in the inverting input port and the non-inverting input port of the first operational amplifier OP11, respectively. The first operational amplifier OP11 outputs differential signals (I_mid_n, I_mid_p) from the inverting output port and the non-inverting output port, respectively.

Resistors R11 and R12 are on the input paths of the first operational amplifier OP11 have, respectively. A variable capacitor C11 is on the feedback path between the non-inverting input port and the inverting output port of the first operational amplifier OP11. A variable capacitor C12 is on the feedback path between the inverting input port and the non-inverting output port of the first operational amplifier OP11.

[Second Operational Amplifier]

The second operational amplifier OP12 is a balanced amplifier. The differential signals (I_mid_n, I_mid_p) output from the first operational amplifier OP11 are input in the inverting input port and the non-inverting input port of the second operational amplifier OP12 via resistors R13 and R14, respectively. The second operational amplifier OP12 outputs differential signals (I_out_n, I_out_p) from the inverting output port and the non-inverting output port, respectively.

A Variable Capacitor C13 is on the feedback path between the non-inverting input port and the inverting output port of the second operational amplifier OP12. A variable capacitor C14 is on the feedback path between the inverting input port and the non-inverting output port of the second operational amplifier OP12.

[Third Operational Amplifier]

The third operational amplifier OP21 is a balanced amplifier. The Q-phase differential signals (Q_in_n and Q_in_p) are input in the inverting input port and the non-inverting input port of the third operational amplifier OP21, respectively. The third operational amplifier OP21 outputs differential signals (Q_mid_n, Q_mid_p) from the inverting output port and the non-inverting output port, respectively.

Resistors R21 and R22 are on the input paths of the third operational amplifier OP21, respectively. A variable capacitor C21 is on the feedback path between the non-inverting input port and the inverting output port of the third operational amplifier OP21. A variable capacitor C22 is on the feedback path between the inverting input port and the non-inverting output port of the third operational amplifier OP21.

[Fourth Operational Amplifier]

The fourth operational amplifier OP22 is a balanced amplifier. The differential signals (Q_mid_n, Q_mid_p) output from the fourth operational amplifier OP22 are input in the inverting input port and the non-inverting input port of the fourth operational amplifier OP22 via resistors R23 and R24, respectively. The fourth operational amplifier OP22 outputs differential signals (Q_out_n, Q_out_p) from the inverting output port and the non-inverting output port, respectively.

A variable capacitor C24 is on the feedback path between the non-inverting input port and the inverting output port of the fourth operational amplifier OP22. A variable capacitor C23 is on the feedback path between the inverting input port and the non-inverting output port of the fourth operational amplifier OP22.

Figure 8:
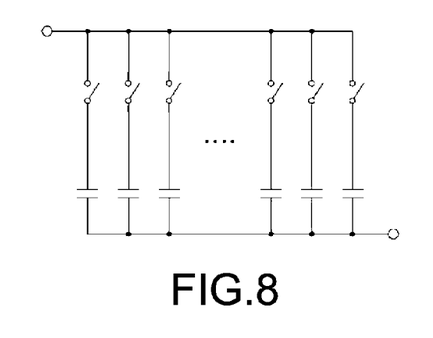
FIG. 8 is a diagram showing a configuration example of a variable capacitor.

Note that each of the variable capacitors C11, C12, C13, C14, C21, C22, C23, and C24 may be a capacitor bank shown in FIG. 8. For example, the controller 60 turns on/off the switches of the capacitor bank such that the variable capacitor has a capacitance value corresponding to the channel of the received signal. The number of the switches of the capacitor bank, which are turned on, is controlled appropriately. As a result, for example, it is possible to change the frequency bandwidth of a signal to be received depending on terrestrial television broadcasting and satellite television broadcasting. Further, for example, it is possible to change the frequency bandwidth of a signal to be received depending on channels of satellite television broadcasting. Note that the frequency bandwidths of signals are different from each other depending on channels of satellite television broadcasting within the range of several MHz to several tens of MHz.

[Changing-Over Switch]

The non-inverting input terminal of the first operational amplifier OP11 is connected to the non-inverting output terminal of the third operational amplifier OP21 via the resistor R31 and the switch SW11 connected in series. The inverting input terminal of the first operational amplifier OP11 is connected to the inverting output terminal of the third operational amplifier OP21 via the resistor R32 and the switch SW12 connected in series.

The non-inverting input terminal of the second operational amplifier OP12 is connected to the non-inverting output terminal of the fourth operational amplifier OP22 via the resistor R36 and the switch SW22 connected in series. The inverting input terminal of the second operational amplifier OP12 is connected to the inverting output terminal of the fourth operational amplifier OP22 via the resistor R35 and the switch SW21 connected in series.

The non-inverting input terminal of the third operational amplifier OP21 is connected to the inverting output terminal of the first operational amplifier OP11 via the resistor R34 and the switch SW32 connected in series. The inverting input terminal of the third operational amplifier OP21 is connected to the non-inverting output terminal of the first operational amplifier OP11 via the resistor R33 and the switch SW31 connected in series.

The non-inverting input terminal of the fourth operational amplifier OP22 is connected to the inverting output terminal of the second operational amplifier OP12 via the resistor R37 and the switch SW41 connected in series. The inverting input terminal of the fourth operational amplifier OP22 is connected to the non-inverting output terminal of the second operational amplifier OP12 via the resistor R38 and the switch SW42 connected in series.

For example, the switches SW11, SW12, SW21, SW22, SW31, SW32, SW41, and SW42 are turned on/off based on control signals from the controller 60.

[Behavior of Filter when Switches are Turned Off]

As shown in FIG. 7B, when receiving satellite television broadcasting, the switches SW11, SW12, SW21, SW22, SW31, SW32, SW41, and SW42 are turned off. So each of the filters 81a and 82a functions as a biquad filter.

Here, the following mathematical formulae (1a) to (1d) show the transfer function T(s), the gain G, the central angle frequency $\omega 0$, and the Q value Q of an I signal and a Q signal input in the filters 81a and 82a, respectively. $s=j\omega$ is satisfied, and $\omega$ is an angular frequency.

Note that each of the resistors R11, R12, R21, and R22 has a resistance value R1. Each of the resistors R13, R14, R23, and R24 has a resistance value R2. Each of the resistors R15, R16, R25, and R26 has a resistance value R3. Each of the resistors R17, R18, R27, and R28 has a resistance value R4. Each of the resistors R31 to R38 has a resistance value Rf. Further, each of the variable capacitors C11, C12, C13, and C14 has a capacitance value C1. Each of the variable capacitors C21, C22, C23, and C24 has a capacitance value C2. Note that in the following mathematical formulae (1a) to (1d), C1=C2=C0 is satisfied.

[Math 1]

$$T(s) = \frac{\frac{R4}{R1} \times \frac{1}{C0^2 \times R2 \times R4}}{s^2 + \frac{s}{C0 \times R3} + \frac{1}{C0^2 \times R2 \times R4}} \quad (1a)$$

$$G = \frac{R4}{R1} \quad (1b)$$

$$\omega 0 = \frac{1}{\sqrt{C0^2 \times R2 \times R4}} \quad (1c)$$

$$Q = \sqrt{\frac{R3^2}{R2 \times R4}} \quad (1d)$$

[Behavior of Filter when Switches are Turned on]

As shown in FIG. 7B, when receiving terrestrial television broadcasting, the switches SW11, SW12, SW21, SW22, SW31, SW32, SW41, and SW42 are turned on. So the signals output from the third operational amplifier OP21 are current-fed back to the input ports of the first operational amplifier OP11 via the resistors R31 and R32 and the switches SW11 and SW12. The signals output from the first operational amplifier OP11 are current-fed back to the input ports of the third operational amplifier OP21 via the resistors R33 and R34 and the switches SW31 and SW32. The signals output from the fourth operational amplifier OP22 are current-fed back to the input ports of the second operational amplifier OP12 via the resistors R35 and R36 and the switches SW21 and SW22. The signals output from the second operational amplifier OP12 are current-fed back to the input ports of the fourth operational amplifier OP22 via the resistors R37 and R38 and the switches SW41 and SW42. In other words, the filters 81a and 82a function as a Low-IF complex filter.

Here, the following mathematical formulae (2a) to (2e) show the transfer function $T(j\omega)$, the gain G, the central angle frequency $\omega 02$, the frequency $\omega f$, and the Q value Q of an I signal and a Q signal input in the filters 81a and 82a, respectively. Note that in the following mathematical formulae (2a) to (2e), C1=C2=C0 is satisfied.

[Math 2]

$$T(s) = \frac{\frac{R4}{R1} \times \frac{1}{C2^2 \times R2 \times R4}}{(j\omega - \omega f)^2 + \frac{(j\omega - \omega f)}{C0 \times R3} + \frac{1}{C0^2 \times R2 \times R4}} \quad (2a)$$

$$G = \frac{R4}{R1} \quad (2b)$$

$$\omega 0 = \frac{1}{\sqrt{C0^2 \times R2 \times R4}} \quad (2c)$$

$$\omega f = \frac{1}{C0 \times Rf} \quad (2d)$$

$$Q = \sqrt{\frac{R3^2}{R2 \times R4}} \quad (2e)$$

Figure 9A:
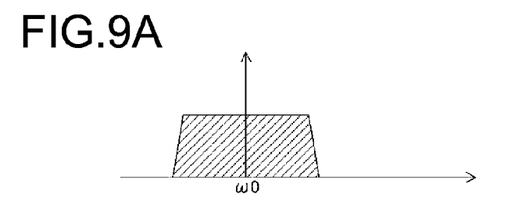
FIGS. 9A and 9B are diagrams each showing frequency characteristics of the filters.
Figure 9B:
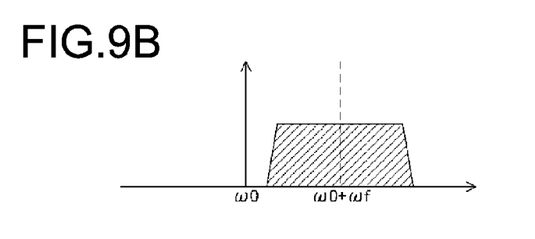

Each of FIG. 9 is a diagram showing frequency characteristics of the filters 81a and 82a. FIG. 9A shows frequency characteristics when the switches are turned off (when receiving satellite television broadcasting). FIG. 9B shows frequency characteristics when the switches are turned on (when receiving terrestrial television broadcasting).

As shown in FIG. 9A, when receiving satellite television broadcasting, the filters 81a and 82a function as lowpass filters, each of which has a central angle frequency ω0. As shown in FIG. 9B, when receiving terrestrial television broadcasting, the filters 81a and 82a function as a bandpass filter, whose central angle frequency shifts out of ω0 by ωf.

[Another Configuration Example of Filter]

Figure 10A:
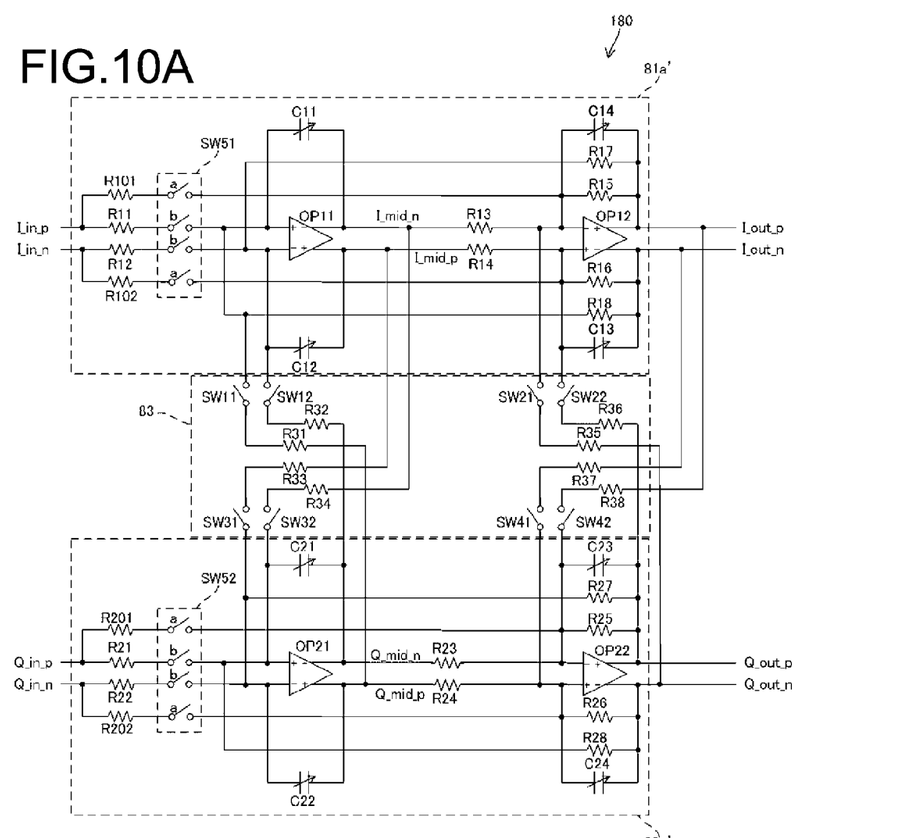
FIGS. 10A and 10B are diagrams showing another specific configuration example of the filter.

FIG. 10 are diagrams showing another specific configuration example of the filter 180. Basically, the configurations of the filters 81a' and 82a' and the switching circuit 83 of FIG. 10A are similar to the configurations of the above-mentioned filters 81a and 82a and the corresponding switching circuit 83. The filters 81a' and 82a' are different from the filters 81a and 82a in that the filters 81a' and 82a' include the switches SW51 and SW52, respectively. The switch SW51 switches between the first operational amplifier OP11 and the second operational amplifier OP12, in which I-phase differential signals (I_in_p, I_in_n) are input. The switch SW52 switches between the third operational amplifier OP21 and the fourth operational amplifier OP22, in which Q-phase differential signals (Q_in_p, Q_in_n) are input. The controller 60 turns on/off the switches SW51 and SW52.

Figure 10B:
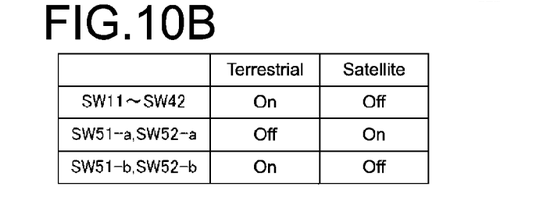

As shown in FIG. 10B, when receiving terrestrial television broadcasting, the switches SW51 and SW52 are turned on/off as follows. The switches SW51-a and SW52-a are turned off, and the switches SW51-b and SW52-b are turned on. As a result, the configuration similar to the configuration of the above-mentioned filter 80 of FIG. 7 is attained.

Meanwhile, as shown in FIG. 10B, when receiving satellite television broadcasting, the switches SW51 and SW52 are turned on/off as follows. The switches SW51-a and SW52-a are turned on, and the switches SW51-b and SW52-b are turned off. As a result, the differential signals (I_in_p, I_in_n) are input in the second operational amplifier OP12 via the resistor R101 and the resistor R102. The differential signals (Q_in_p, Q_in_n) are input in the fourth operational amplifier OP22 via the resistor R201 and the resistor R202. In other words, each of the filters 81a' and 82a' functions as a first-order lowpass filter.

Meanwhile, the signals output from the second operational amplifier OP12 are fed back to the input ports of the first operational amplifier OP11 via the resistor R17 and the resistor R18, the positive/signal signals being inverted. The signals output from the fourth operational amplifier OP22 are fed back to the input ports of the third operational amplifier OP21 via the resistor R27 and the resistor R28, the positive/signal signals being inverted.

Here, the resistor R17, the capacitor C11, the resistor R18, and the capacitor C12 function as lowpass filters. So the first operational amplifier OP11 inverting-amplifies only predetermined part, which is close to the DC component, of the signals output from the second operational amplifier OP12. The first operational amplifier OP11 inputs the inverting-amplified signals to the second operational amplifier OP12 via the resistor R13 and the resistor R14.

Further, the resistor R27 and the resistor R28 function as lowpass filters. So the third operational amplifier OP21 inverting-amplifies only predetermined part, which is close to the DC component, of the signals output from the fourth operational amplifier OP22. The third operational amplifier OP21 inputs the inverting-amplified signals to the fourth operational amplifier OP22 via the resistor R23 and the resistor R24.

As a result, the following phenomenon occurs. The offset base voltage of the positive differential signal output from the second operational amplifier OP12 is a high voltage. The offset base voltage of the negative differential signal output from the second operational amplifier OP12 is a low voltage. The differential signals from the second operational amplifier OP12 are inverted and input in the first operational amplifier OP11. Here, the differential signals from the second operational amplifier OP12 are fed back such that the positive differential signal and the negative differential signal are balanced. So the DC components of the signals from the second operational amplifier OP12 are canceled.

Similarly, the offset base voltage of the positive differential signal output from the fourth operational amplifier OP22 is a high voltage. The offset base voltage of the negative differential signal output from the fourth operational amplifier OP22 is a low voltage. The differential signals from the fourth operational amplifier OP22 are inverted and input in the third operational amplifier OP21. Here, the differential signals from the fourth operational amplifier OP22 are fed back such that the positive differential signal and the negative differential signal are balanced. So the DC components of the signals from the fourth operational amplifier OP22 are canceled.

In this case, the following mathematical formulae (3a) to (3e) show the transfer function T(s), the gain G, and the central angle frequency cc. Further, in this case, the following mathematical formulae (4a) and (4b) show the time constant and the DC offset cancel upper-limit frequency ωhp. The lowpass component equal to or lower than ωhp is removed.

[Math 3]

$$T(s) = \frac{\frac{R3}{R5}}{s + \frac{1}{C2 \times R3}} \quad (3a)$$

$$G = \frac{R3}{R5} \quad (3b)$$

$$\omega c = \frac{1}{C2 \times R3} \quad (3d)$$

$$Q = 0.5 \quad (3e)$$

-continued

[Math 4]

$$T(s) = \frac{\frac{R3}{R5}}{s + \frac{R3}{C1 \times R2 \times R4}} \quad (4a)$$

$$whp = \frac{R3}{C1 \times R2 \times R4} \quad (4b)$$

As described above, the filter 180 is capable of receiving both terrestrial television broadcasting and satellite television broadcasting, and further capable of canceling DC offset. Such DC offset occurs if the frequency of an LO signal is the same as the frequency of an RF signal when receiving a ZERO-IF signal. The filter 180 is capable of reducing such DC offset without increasing the layout area. In addition, if the lower-limit or the upper-limit of signal amplitude is restricted, distortion characteristics are degraded, which is problematic. The filter 180 is capable of preventing such a problem from occurring.

Note that the present technology is not limited to the above-mentioned embodiment. The configurations disclosed in the above-mentioned embodiment may be substituted, combined, and modified with each other. The configurations disclosed in the above-mentioned embodiment may be substituted, combined, and modified with known technologies. The present technology comprehensively includes such substitutions, combinations, modifications, and the like. Further, the technical scope of the present technology is not limited to the above-mentioned embodiment, and contains the matters described in the claims and the equivalents thereof.

Further, the present technology may have the following configurations (1) to (11).

(1) A receiver apparatus, including:
a first receiver configured to receive a first signal having a first frequency band; and
a second receiver configured to receive a second signal having a second frequency band, the second frequency band being different from the first frequency band, in which
a signal path for the first signal and a signal path for the second signal share at least one component in a signal path for extracting an intermediate-frequency signal from a received signal, the component being configured to extract a signal of a particular channel from the received signal as the intermediate-frequency signal.

(2) The receiver apparatus according to (1), in which
the shared component is a mixer configured to mix local oscillator frequency signals from a local oscillator and one of the first signal and the second signal to thereby generate an intermediate-frequency signal.

(3) The receiver apparatus according to (2), in which
the mixer is a harmonic rejection mixer, and
the local oscillator is configured to input the local oscillator frequency signals in the mixer, the phase-shift angle of local oscillator frequency signals to be mixed with the first signal being different from the phase-shift angle of local oscillator frequency signals to be mixed with the second signal.

(4) The receiver apparatus according to (3), in which
the first signal is a terrestrial television broadcasting signal,
the second signal is a satellite television broadcasting signal, and
the local oscillator is configured
to generate local oscillator frequency signals out of phase with each other by 45 degrees to be mixed with the first signal, and to input the generated local oscillator frequency signals in the mixer, and
to generate local oscillator frequency signals out of phase with each other by 90 degrees to be mixed with the second signal, and to input the generated local oscillator frequency signals in the mixer.

(5) The receiver apparatus according to any one of (1) to (4), in which
the shared component is a filter configured to selectively transmit one of a signal having a frequency corresponding to the first frequency band of the intermediate-frequency signal and a signal having a frequency corresponding to the second frequency band of the intermediate-frequency signal.

(6) The receiver apparatus according to (5), in which
the filter is configured to selectively function as one of a lowpass filter and a bandpass filter.

(7) The receiver apparatus according to (5) or (6), in which
the first signal is a terrestrial television broadcasting signal,
the second signal is a satellite television broadcasting signal, and
the filter is configured
to function as a bandpass filter when receiving the first signal, and
to function as a lowpass filter when receiving the second signal.

(8) The receiver apparatus according to any one of (5) to (7), in which
the filter includes
a first lowpass filter in which an I signal is input, and
a second lowpass filter in which a Q signal is input, and
the filter functions as a complex filter configured, when receiving the first signal,
to input the I signal passing through the first lowpass filter in the second lowpass filter, and
to input the Q signal passing through the second lowpass filter in the first lowpass filter.

(9) The receiver apparatus according to (8), in which
each of the first lowpass filter and the second lowpass filter includes
an operational amplifier, and
a variable capacitor on a feedback path of the operational amplifier.

(10) A tuner, including:
a first receiver configured to receive a first signal having a first frequency band; and
a second receiver configured to receive a second signal having a second frequency band, the second frequency band being different from the first frequency band, in which
a signal path for the first signal and a signal path for the second signal share at least one component in a signal path for extracting an intermediate-frequency signal from a received signal, the component being configured to extract a signal of a particular channel from the received signal as the intermediate-frequency signal.

(11) A circuit, including:
a first receiver configured to receive a first signal having a first frequency band; and
a second receiver configured to receive a second signal having a second frequency band, the second frequency band being different from the first frequency band, in which
a signal path for the first signal and a signal path for the second signal share at least one component in a signal path for extracting an intermediate-frequency signal from a received signal, the component being configured to extract a signal of a particular channel from the received signal as the intermediate-frequency signal.

It should be understood by those skilled in the art that various modifications, combinations, sub-combinations and alterations may occur depending on design requirements and other factors insofar as they are within the scope of the appended claims or the equivalents thereof.

What is claimed is:

1. A receiver apparatus, comprising:
    a first receiver configured to receive a first signal having a first frequency band; and
    a second receiver configured to receive a second signal having a second frequency band, the second frequency band being different from the first frequency band,
    wherein a signal path for the first signal and a signal path for the second signal share a component in a signal path for extracting an intermediate-frequency signal from a received signal, the component being configured to extract a signal of a particular channel from the received signal as the intermediate-frequency signal, the component being configured to directly receive both the first signal from the first receiver and the second signal from the receiver,
    wherein the component is a filter configured to selectively transmit one of a signal having a frequency corresponding to the first frequency band of the intermediate-frequency signal and a signal having a frequency corresponding to the second frequency band of the intermediate-frequency signal, and
    wherein the filter includes:
    a first lowpass filter in which an I signal is input;
    a second lowpass filter in which a Q signal is input, and
    the filter functions as a complex filter configured, when receiving the first signal, to input the I signal passing through the first lowpass filter in the second lowpass filter, and to input the Q signal passing through the second lowpass filter in the first lowpass filter.

2. The receiver apparatus according to claim 1, wherein the filter is configured to selectively function as one of a lowpass-type filter and a bandpass-type filter.

3. The receiver apparatus according to claim 1, wherein the first signal is a terrestrial television broadcasting signal,
    the second signal is a satellite television broadcasting signal, and
    the filter is configured
        to function as a bandpass-type filter when receiving the first signal, and
        to function as a lowpass-type filter when receiving the second signal.

4. The receiver apparatus according to claim 1, wherein each of the first lowpass filter and the second lowpass filter includes:
    an operational amplifier, and
    a variable capacitor on a feedback path of the operational amplifier.

5. A tuner, comprising:
    a first receiver configured to receive a first signal having a first frequency band; and
    a second receiver configured to receive a second signal having a second frequency band, the second frequency band being different from the first frequency band,
    wherein a signal path for the first signal and a signal path for the second signal share a component in a signal path for extracting an intermediate-frequency signal from a received signal, the component being configured to extract a signal of a particular channel from the received signal as the intermediate-frequency signal, the component being configured to directly receive both the first signal from the first receiver and the second signal from the receiver,
    wherein the component is a filter configured to selectively transmit one of a signal having a frequency corresponding to the first frequency band of the intermediate-frequency signal and a signal having a frequency corresponding to the second frequency band of the intermediate-frequency signal, and
    wherein the filter includes:
    a first lowpass filter in which an I signal is input; and
    a second lowpass filter in which a Q signal is input, and
    the filter functions as a complex filter configured, when receiving the first signal, to input the I signal passing through the first lowpass filter in the second lowpass filter, and to input the Q signal passing through the second lowpass filter in the first lowpass filter.

6. A circuit, comprising:
    a first receiver configured to receive a first signal having a first frequency band; and
    a second receiver configured to receive a second signal having a second frequency band, the second frequency band being different from the first frequency band, wherein
    a signal path for the first signal and a signal path for the second signal share a component in a signal path for extracting an intermediate-frequency signal from a received signal, the component being configured to extract a signal of a particular channel from the received signal as the intermediate-frequency signal, the component being configured to directly receive both the first signal from the first receiver and the second signal from the receiver,
    wherein the component is a filter configured to selectively transmit one of a signal having a frequency corresponding to the first frequency band of the intermediate-frequency signal and a signal having a frequency corresponding to the second frequency band of the intermediate-frequency signal, and
    wherein the filter includes:
    a first lowpass filter in which an I signal is input; and
    a second lowpass filter in which a Q signal is input, and
    the filter functions as a complex filter configured, when receiving the first signal, to input the I signal passing through the first lowpass filter in the second lowpass filter, and to input the Q signal passing through the second lowpass filter in the first lowpass filter.

7. The tuner according to claim 5, wherein
    the filter is configured to selectively function as one of a lowpass-type filter and a bandpass-type filter.

8. The tuner according to claim 5, wherein
    the first signal is a terrestrial television broadcasting signal,
    the second signal is a satellite television broadcasting signal, and
    the filter is configured:
        to function as a bandpass-type filter when receiving the first signal, and
        to function as a lowpass-type filter when receiving the second signal.

9. The tuner according to claim 5, wherein
each of the first lowpass filter and the second lowpass filter includes
an operational amplifier, and
a variable capacitor on a feedback path of the operational amplifier.

* * * * *